United States Patent
Kelly

(10) Patent No.: US 6,798,110 B1
(45) Date of Patent: Sep. 28, 2004

(54) BRUSH CARD

(76) Inventor: Jack Kelly, 84 Kenninghall Crs, Mississauga, Ontario (CA), L5N 2T9

( * ) Notice: Subject to any disclaimer, the term of this patent is extended or adjusted under 35 U.S.C. 154(b) by 0 days.

(21) Appl. No.: 10/385,733

(22) Filed: Mar. 12, 2003

(51) Int. Cl.[7] .............................................. H02K 13/00
(52) U.S. Cl. ...................................... 310/239; 310/242
(58) Field of Search ................................ 310/239, 242, 310/245, 246, 247, 248

(56) References Cited

U.S. PATENT DOCUMENTS

| 2,763,800 | A | * | 9/1956 | Curley | 310/239 |
| 4,112,321 | A | * | 9/1978 | Wan | 310/242 |
| 4,354,128 | A | * | 10/1982 | Chew et al. | 310/242 |
| 4,559,465 | A | * | 12/1985 | Gagneux | 310/242 |

* cited by examiner

Primary Examiner—Burton S. Mullins
Assistant Examiner—Nguyen Hanh
(74) Attorney, Agent, or Firm—Elias C. Borges

(57) ABSTRACT

The present invention is an improved brush card consisting of a non conductive card having a commutator aperture, and a pair of tongue and groove connectors. Each tongue and groove connector consists of at least one pair of parallel channels formed on the card adjacent the aperture and extending along the card perpendicular to the commutator aperture, the card forming a pair of parallel opposing channel edges adjacent the parallel channels. A portion of the card forms an elongated tongue separating the pair of channels, the tongue having a distal end extending towards the commutator aperture and a proximal end opposite the distal end. The brush card also includes at least one conductive brush slidingly mounted to each tongue, the brush having opposite first and second sides, the brush having a central groove dimensioned to receive the tongue. Each brush also has a first groove extending along the first side of the brush, the first groove dimensioned to receive one of the channel edges. Each brush also has a second groove extending along the second side of the brush, the second groove dimensioned to receive the other channel edge. The card further includes a biasing spring mounted to each tongue and positioned between the brush and the proximal end of the tongue, the biasing spring biasing the brush towards the commutator aperture.

23 Claims, 5 Drawing Sheets

BRUSH CARD

FIELD OF THE INVENTION

The invention relates generally to brush cards for electric motors and electric generators.

BACKGROUND OF THE INVENTION

Electric motors generally consist of an axle holding an armature and commutator which are mounted in a housing. The housing contains a pair of field magnets (or electro magnetic windings, depending on the type of motor) which surround the armature. Electric current is supplied to the commutator by a pair of graphite/copper brushes. The brushes are generally mounted to the housing on a brush card. The brush card generally consists of a flat card die-stamped out of a paper based high pressure laminate, plastic or polyester glass sheet. In a majority of brush cards, the brushes are each carried in a hollow metal tube which houses both a brush and a biasing spring. The spring biases the brush towards the commutator ensuring the brush makes electrical contact with the commutator. The metal tube, which is often referred to as a brush tube, can be made of brass or steel, depending on the desired durability and reliability of the brush card assembly. The brush tubes are generally rectangular tubes having an open bottom, an open end and four legs projecting from the bottom. The brush tubes are attached to the card by passing the legs of the tubes through holes punched in the brush card and then crimping the portions of the legs which extend pass the brush card. The spring and the brushes are then inserted into the brush tubes.

While the use of brush tubes has proven to be a reliable method of mounting the brushes to the brush card, there are several disadvantages with this construction. Firstly, the added costs associated with mounting the brush tubes to the brush cards are not inconsequential. If the brush tubes are made of brass, the brush tubes alone will add several cents to the material costs of assembling the brush card. Furthermore, the steps of mounting the brush tubes to the card and then inserting the spring and brush into the brush tube add to the cost of manufacturing the brush card. In addition to added cost, the brush tubes also adds a point of failure to the finished brush card assembly, increasing the possibility that the electric motor will fail due to a poorly assembled brush card tube. Furthermore, the brush tubes, being made of metal, have a tendency to conduct heat and, during the course of extended operations, may become overheated. The overheated brush tubes may cause warping of the housing or surrounding brush card, causing the brushes to jam. Also, the continual heating and cooling of the brush tubes can cause the tubes to become loose, resulting in a motor that fails to meet the required decibel specifications. An improved brush card which is easier and less expensive to construct and which does not suffer from the drawbacks of existing brush cards is therefore desirable.

SUMMARY OF THE INVENTION

In accordance with the present invention, there is provided a brush card consisting of a non conductive sheet material having a commutator aperture, and a pair of tongue and groove connector elements. Each tongue and groove connector element consisting of at least one pair of parallel channels formed on the card adjacent the aperture and extending along the card perpendicular to the commutator aperture, the card forming a pair of parallel opposing channel edges adjacent the parallel channels. A portion of the card forms an elongated tongue separating each pair of channels, the tongue having a distal end extending towards the commutator aperture and a proximal end opposite the distal end. The brush card also includes a conductive brush slidingly mounted to each tongue, each brush having opposite first and second sides and a central groove dimensioned to receive the tongue. Each brush also has a first groove extending along the first side of the brush, the first groove dimensioned to receive one of the channel edges. Each brush also has a second groove extending along the second side of the brush, the second groove dimensioned to receive the other channel edge. The card further includes a biasing spring located on each tongue and positioned between the brush and the proximal end of the tongue, the biasing spring biasing the brush towards the commutator aperture.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
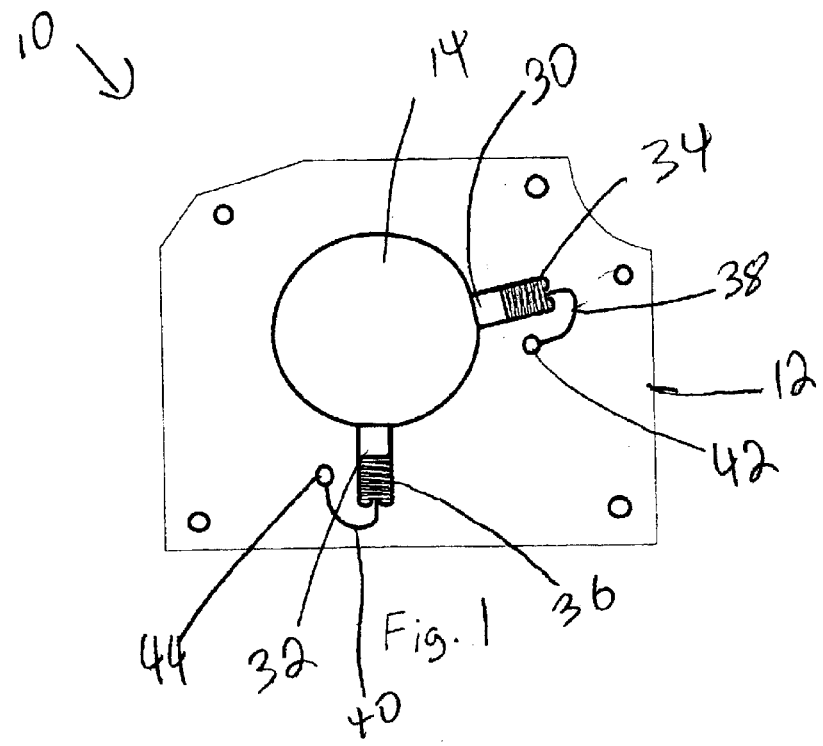
FIG. 1. is a top view of a brush card made in accordance with the present invention.
Figure 2:
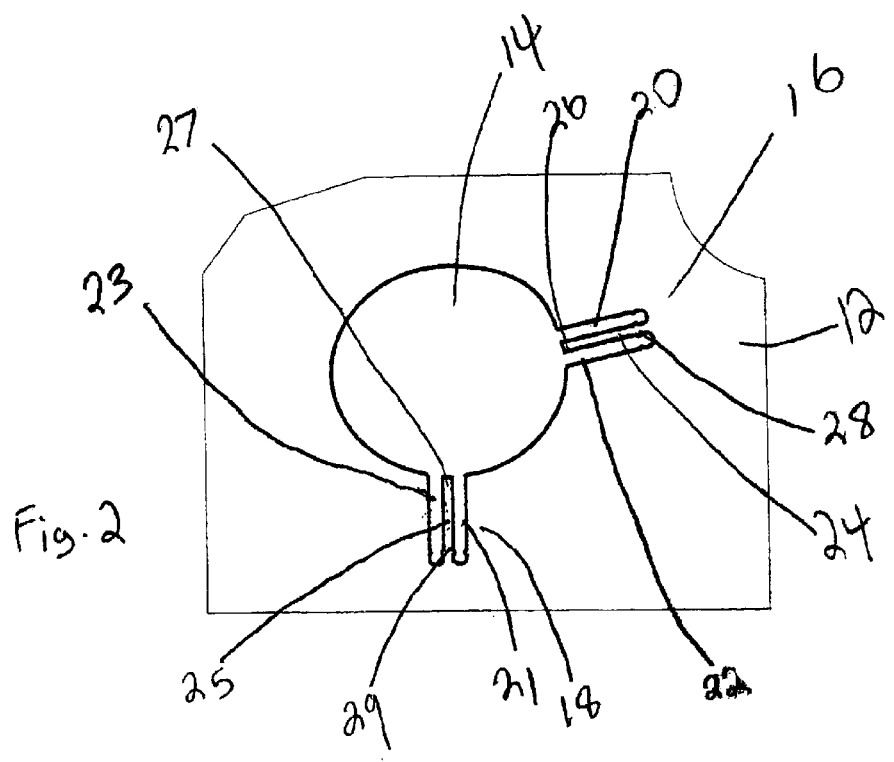
FIG. 2. is a top view of the brush card shown in FIG. 1 which does not have the brushed mounted thereto.

Referring firstly to FIGS. 1 and 2 the brush card made in accordance with the present invention is shown generally as item 10 and consists of a substantially planar card 12 die stamped from a non-conductive material such as paper based high pressure laminate, a polyester glass sheet, or injection molded plastic. Card 12 has a central aperture, referred to as commutator aperture 14, which is dimensioned to retain the commutator of an electric motor or generator (not shown). Two pairs of tongue and groove connector elements 16 and 18 are formed on card 12 and extend perpendicular to commutator aperture 14. Connector 16 consists of two parallel channels 20 and 22 which extend perpendicularly from commutator aperture 14. Tongue 24 is formed between channels 20 and 22. Tongue 24 has distal end 26 which extends towards commutator aperture 14. Tongue 24 also has proximal end 28 opposite the distal end. Likewise, connector 18 consists of two parallel channels 21 and 23 which extend perpendicularly from commutator aperture 14. Tongue 25 is formed between channels 21 and 24. Tongue 25 has distal end 27 which extends towards commutator aperture 14. Tongue 25 also has proximal end 29 opposite the distal end. Essentially, tongue and groove connector elements 16 and 18 are identical.

The brush card also includes electrical brushes 30 and 32 mounted to tongue and groove connector elements 16 and 18, respectively. Brushes 30 and 32 are biased towards aperture 14 by biasing springs 34 and 36, respectively. Finally, flexible electrical wires 38 and 40 electrically couple brushes 30 and 32 with electrical terminals 42 and 44, respectively.

Figure 3:
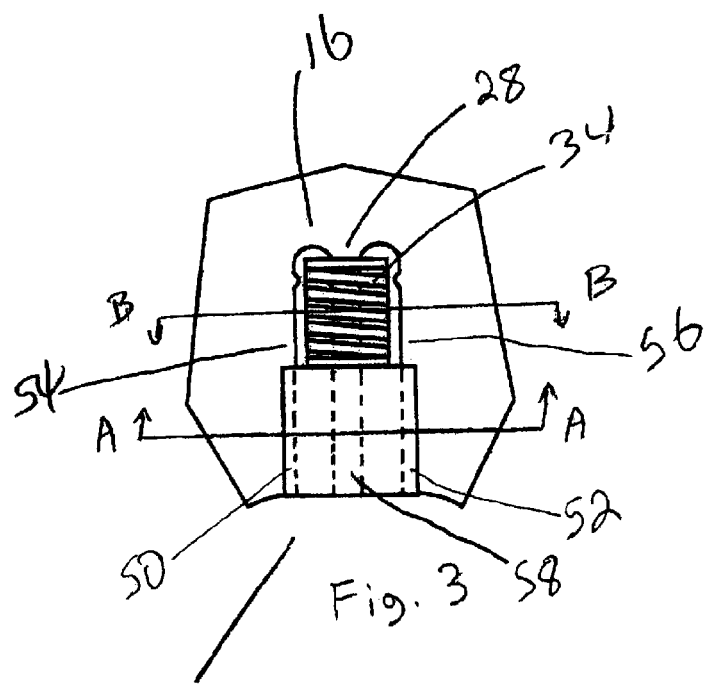
FIG. 3. is an expanded top view of a portion of the brush card shown in FIG. 1.
Figure 4:
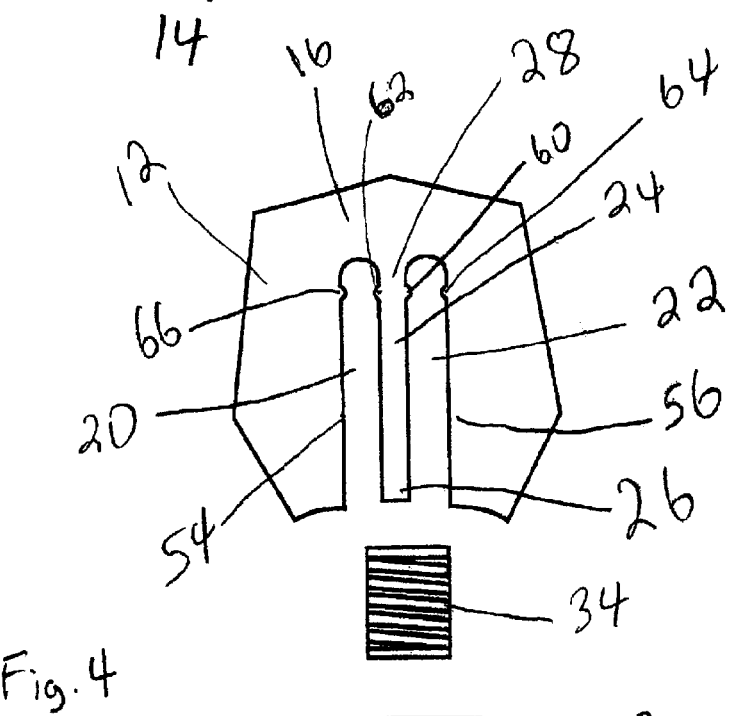
FIG. 4. is an exploded view of the portion of the brush card shown in FIG. 3.

Referring now to FIGS. 3 and 4, the details of how a brush is mounted within its respective tongue and groove connector element shall now be explained in greater detail with reference to tongue and groove connector element 16, brush 30 and biasing spring 34. Brush 30 has opposite side walls 46 and 48. First groove 50 is formed on side wall 46 of brush 30 and second groove 52 is formed on side wall 48 of brush 30. Card 12 has edge 54 which extends along groove 20 and edge 56 which extends along groove 22. Grooves 46 and 52 are dimensioned and configured to retain edges 54 and 56 when brush 30 is inserted into connector element 16. Brush 30 also has central groove 58 formed between side walls 46 and 48. Central groove 58 is dimensioned and configured to receive tongue 24. Biasing spring 34 is a coil spring which is dimensioned and configured to fit onto tongue 24. When assembled, biasing spring 34 is positioned on tongue 24 between ends 28 and 26. Tongue 24 has projections 60 and 62 adjacent proximal end 28 which extend from the tongue into channels 22 and 20, respectively. Projections 60 and 62 are dimensioned to retain spring 34 on tongue 24 when the spring is placed onto tongue 24. Corresponding projections 64 and 66 are also formed on edges 56 and 54, respectively, to ensure that the biasing spring is securely held in place when the spring is placed onto tongue 24. Projections 60, 62, 64 and 66 help retain spring 34 and prevent it from being accidentally dislodged off tongue 24 during brush card assembly. It will be appreciated that projections 60, 62, 64 and 66 may not always be required, since the tongue locates and secures the spring, holding it in place.

Figure 5:
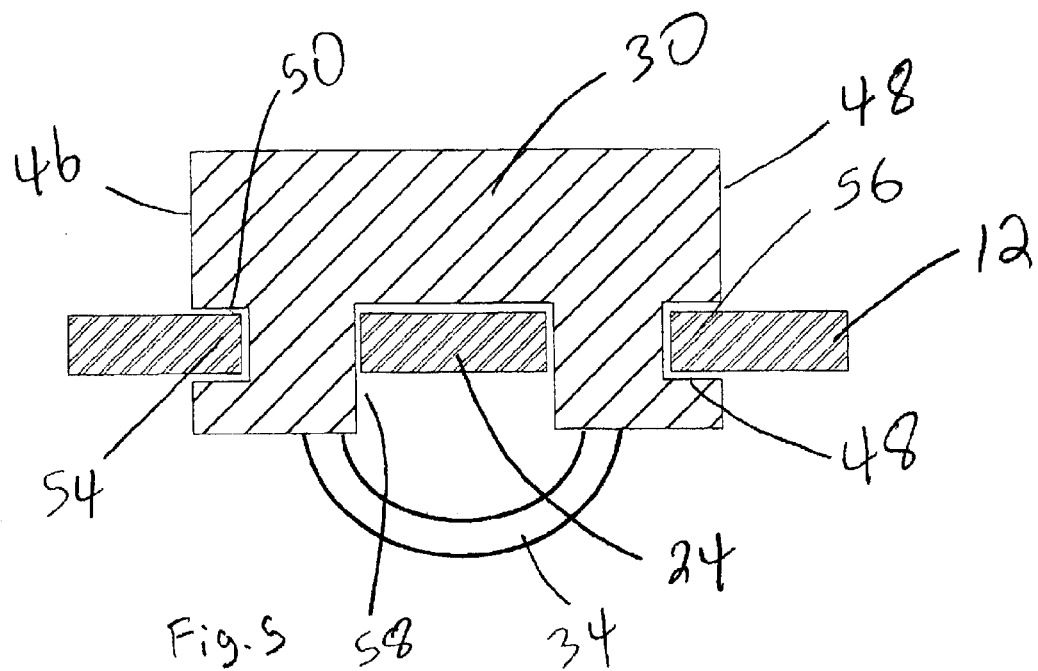
FIG. 5. is a cross sectional view taken along line A-A of FIG. 3.
Figure 6:
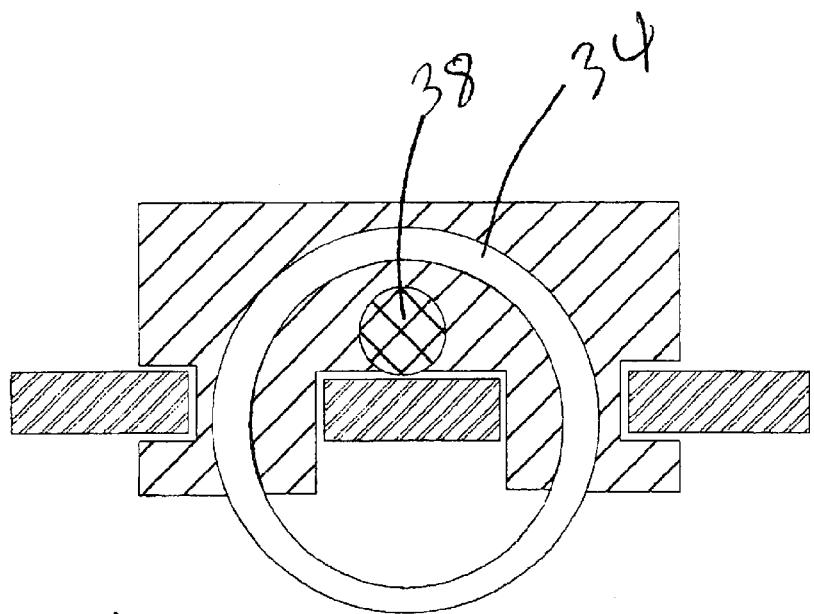
FIG. 6. is a cross sectional view taken along line B-B of FIG. 3.

Referring now to FIGS. 5 and 6, grooves 50 and 48 are coplanar with edges 54 and 56 and are dimensioned to receive the edges such that brush 30 can slide back and forth along edges 54 and 56. Tongue 24 and grove 58 are also coplanar with edges 54 and 56. Tongue 24 and grove 58 ensure that brush 30 can slide back and forth without twisting and catching on edges 54 or 56. Electrical wire 38 is threaded through biasing spring 34 to permit a more compact arrangement. Alternatively, electrical wire 38 may be connected to the brush without passing through biasing spring 34.

Referring back to FIGS. 3 and 4, tongue 24 and groove 58 ensures that brush 30 can slide back and forth in connector 16 without jamming. Brush 30 has an electrical contact face 68 which projects into commutator aperture 14 and which, when assembled in an electric motor, makes electrical contact with the commutator (not shown). Since the commutator rotates within commutator aperture 14, the commutator rubs against electrical contact face 68 thereby applying torsional forces onto brush 30. These torsional forces may cause brush 30 to twist such that the brush catches on edges 54 and 56. Since central groove 58 and tongue 24 form a tongue and groove connection very close to the center of brush 30, they effectively prevent brush 30 from twisting as a result of the torsional forces applied to the brush. Tongue 24 and groove 58 thereby permit the brush to move back and forth along connector 16 without jamming onto edges 54 and 56. Tongue 24 also has the added benefit of acting as a convenient mounting and retaining mechanism for biasing spring 34. If tongue 24 were not present, then biasing spring 34 would not be as securely mounted within connector element 16 and could fall out during either assembly or operation.

Figure 7:
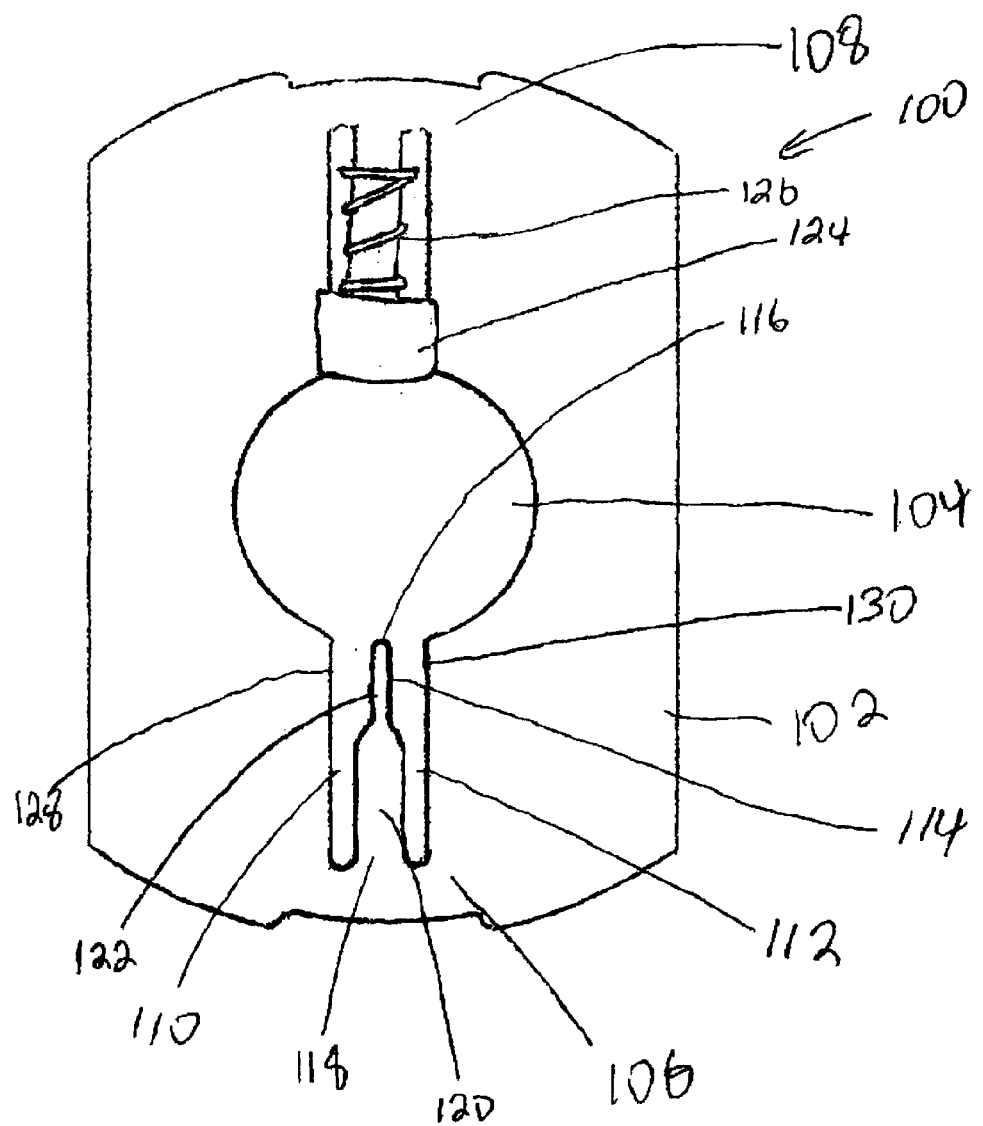
FIG. 7. is a top view of a brush card having a slightly different tongue and connector elements.

Referring now to FIG. 7, an alternate embodiment of the present invention is shown. The alternate brush card, shown generally as item 100, consists of non-conductive card 102 having commutator opening 104 and tongue and groove connector elements 106 and 108. Tongue and groove connector elements 106 and 108 are identical. Both connector elements have parallel grooves 110 and 112 and elongated tongue 114 and edges 128 and 130 formed on the card. Like the previous embodiment, tongue 114 has distal end 116 extending towards commutator opening 104 and proximal end 118 opposite the distal end. Unlike the previous embodiment, tongue 114 has first portion 122 adjacent the commutator opening and second portion 120. Second portion 120 is wider than first portion 122. Brush 124 is mounted to first portion 122 of tongue 114 and to edges 128 and 130 in a tongue and groove fashion as in the previous embodiment. Biasing spring 126 is mounted to second portion 120. Since second portion 120 is wider than first portion 122, biasing spring 126 can be more securely held on the tongue.

The present invention does away with the need for brush tubes. As a result, the brush card is far less expensive to manufacture because it saves on the cost of the tubes themselves and also on the costs of assembling the brush tubes onto the brush card.

Figure 8:
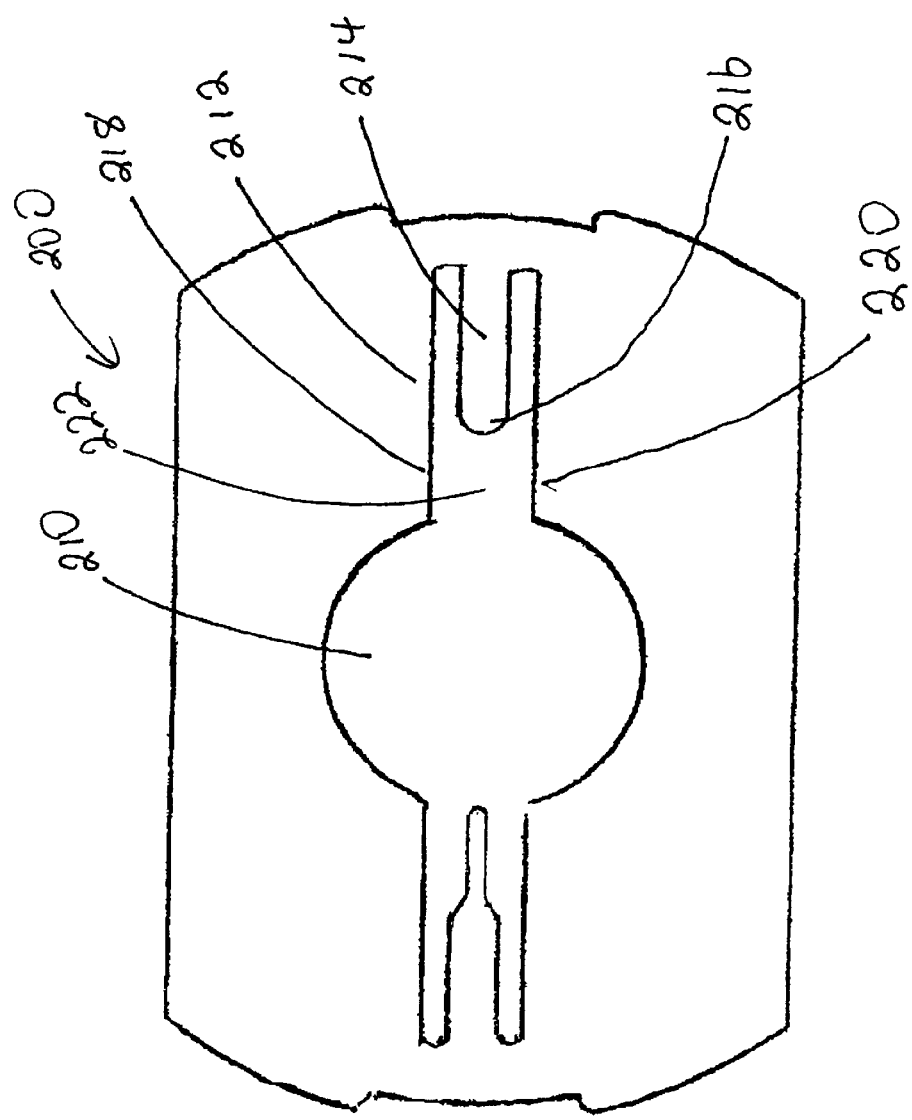
FIG. 8. is a top view of an alternate brush card made in accordance with the present invention.

Referring now to FIG. 8, an alternate embodiment of the brush card portion of the present invention is shown generally as item 200. As with the previous embodiments, brush card 200 consists of a flat planar card made of a non-conductive material and having a commutator opening 210. Tongue and groove connector element 212 is formed on the card. Like the previous embodiments, tongue 214 forms part of tongue and groove connector element 212. Unlike the previous embodiments, tongue 214 has a distal end 216 which does not extend all the way to commutator opening 210, leaving a gap 222 having opposing edges 218 and 220. The brush (not shown) can be slidingly mounted within gap 222 as in the previous embodiments by means of grooves on the sides of the brush which engage edges 220 and 218. Also as in the previous embodiments, the coil biasing spring (not shown) may be threaded onto tongue 214 in order to bias the brush towards the commutator opening. In this design, since tongue 214 does not project into gap 222, the brush will not have to have a central groove in order to accommodate the tongue. This will be an advantage is very small electric motors, where the brushes are very small.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A brush card comprising:
   a non conductive card having a commutator aperture;
   at least one pair of parallel channels formed on the card adjacent the aperture and extending along the card perpendicular to the commutator aperture, the card forming a pair of parallel opposing channel edges adjacent the parallel channels, a portion of the card forming an elongated tongue separating the pair of channels, the tongue having a distal end extending towards the commutator aperture and a proximal end opposite the distal end, a conductive brush slidingly mounted to the tongue, the brush having opposite first and second sides, the brush having a central groove dimensioned to receive the tongue, the brush having a first groove extending along the first side of the brush, the first groove dimensioned to receive one of the channel edges, the brush having a second groove extending along the second side of the brush, the second groove dimensioned to receive the other channel edge, a biasing spring mounted to the tongue and positioned between the brush and the proximal end of the tongue, the biasing spring biasing the brush towards the commutator aperture.

2. The brush card defined in claim 1 further comprising an electrical wire coupled to the brush, a portion of the wire passing through the biasing spring.

3. The brush card defined in claim 1 wherein the brush card is substantially planar and the first and second grooves, the central groove, the tongue and the channel edges are all on the same plane.

4. The brush card defined in claim 1 wherein the spring is a coil spring and the spring is wrapped around the tongue.

5. The brush card defined in claim 1 wherein the tongue has a first portion adjacent the distal end and a second portion adjacent the proximal end, the second portion of the tongue being wider than the first portion of the tongue.

6. The brush card defined in claim 5 wherein the biasing spring is a coil spring, the spring being wrapped around the second portion of the tongue.

7. The brush card defined in claim 1 further comprising a second pair of parallel channels formed on the card adjacent the aperture and extending along the card perpendicular to the commutator aperture, the card forming a second pair of parallel opposing channel edges adjacent the second pair of parallel channels, a portion of the card forming a second elongated tongue separating the second pair of channels, the second tongue having a distal end extending towards the commutator aperture and a proximal end opposite the distal end, a second conductive brush slidingly mounted to the second tongue, the second brush having opposite first and second sides, with corresponding first and second grooves and a central groove dimensioned to receive the tongue, the first and second grooves of the second brush dimensioned to receive the second channel edges, and a second biasing spring mounted to the second tongue between the second brush and the proximal end of the second tongue, the biasing spring biasing the second brush towards the commutator aperture.

8. A brush card comprising:

a non conductive card having a commutator aperture;

a portion of the card adjacent the commutator aperture forming an elongated tongue, the tongue having a distal end extending towards the commutator aperture and a proximal end opposite the distal end, a conductive brush slidingly mounted to the tongue, the brush having a central groove dimensioned to receive the tongue, a biasing spring mounted to the tongue and positioned between the brush and the proximal end of the tongue, the biasing spring biasing the brush towards the commutator aperture.

9. The brush card as defined in claim 8 wherein the card is substantially planar and wherein the card, tongue and central groove of the brush are co-planar.

10. The brush card as defined in claim 9 wherein a portion of the card adjacent the tongue forms a first and a second opposite edges, the tongue positioned between the first and second opposite edges, the brush having opposite first and second sides, the first side having a first groove dimensioned to receive the first edge, the second side having a second groove dimensioned to receive the second edge, the brush being mounted to the card between the two edges with the first and second edges and the first and second grooves forming a pair of tongue and groove connections.

11. The brush card defined in claim 10 wherein the first and second edges, the first and second grooves the tongue and the central groove are all co-planar.

12. The brush card defined in claim 11 wherein the biasing spring is a coil spring and further comprising a flexible electrical wire mounted to the brush, a portion of the electrical wire passing through the biasing spring.

13. The brush card defined in claim 11 wherein a spring retaining means is formed on the tongue adjacent the proximal end, the protrusions dimensioned to retain the biasing spring.

14. The brush card defined in claim 8 wherein the spring is a coil spring and the tongue passes through the coil spring.

15. The brush card defined in claim 8 wherein the tongue has a first portion adjacent the distal end and a second portion adjacent the proximal end, the second portion of the tongue being wider than the first portion of the tongue.

16. The brush card defined in claim 15 wherein the biasing spring is a coil spring, the spring being wrapped around the second portion of the tongue.

17. The brush card of claim 8 further wherein a second portion of the card adjacent the commutator aperture forms a second elongated tongue, the second tongue having a distal end extending towards the commutator aperture and a proximal end opposite the distal end, a second conductive brush slidingly mounted to the second tongue, the second brush having a central groove dimensioned to receive the second tongue, and a second biasing spring mounted to the second tongue between the second brush and the proximal end of the second tongue, the biasing spring biasing the second brush towards the commutator aperture.

18. A brush card comprising:

a non-conductive planar card having a commutator opening;

a pair of tongue and groove connector elements formed on the card adjacent the commutator opening, the tongue and groove connector elements being coplanar with the card, each tongue and groove connector element comprising a pair of opposed parallel edges formed on the card, the edges extending perpendicularly from the commutator opening, a brush mounted to each tongue and groove connector element, each brush having opposite first and second sides with respective first and second grooves dimensioned and configured to receive the edges, a biasing spring mounted in each tongue and groove connector element for biasing each brush towards the commutator opening, and each tongue and groove connector element further comprising an elongated tongue formed on the card and positioned between the edges, the biasing spring being mounted to the tongue.

19. A brush card comprising:

a non-conductive planar card having a commutator opening;

a pair of tongue and groove connector elements formed on the card adjacent the commutator opening, the tongue and groove connector elements being coplanar with the card, each tongue and groove connector element comprising a pair of opposed parallel edges formed on the card, the edges extending perpendicularly from the commutator opening a brush mounted to each tongue and groove connector element, each brush having opposite first and second sides with respective first and second grooves dimensioned and configured to receive the edges, a biasing spring mounted in each tongue and groove connector element for biasing each brush towards the commutator opening, each tongue and groove connector element further comprising an elongated tongue formed on the card and positioned between the edges, the biasing spring being mounted to the tongue, the tongue extending parallel with the edges, and wherein each brush includes a central groove positioned between the first and second sides, the central groove dimensioned and configured to receive the tongue.

20. The brush card of claim 19 wherein the tongue has a distal end adjacent the commutator opening and a proximal end opposite the distal end, the biasing spring being mounted to the tongue between the brush and the proximal end.

21. The brush card of claim 20 wherein the tongue has a first portion adjacent the distal end and a second portion adjacent the proximal end, the second portion being wider than the first portion.

22. The brush card of claim 21 wherein the biasing spring is a coil spring and the tongue passes through the coil spring.

23. The brush card of claim 20 wherein the biasing spring is a coil spring and the tongue passes through the coil spring.

* * * * *